US009663343B2

(12) United States Patent
Veldhi et al.

(10) Patent No.: US 9,663,343 B2
(45) Date of Patent: May 30, 2017

(54) SYSTEMS AND METHODS FOR RECEPTACLE AUTO FILL USING INDUCTIVE SENSING

(71) Applicant: General Electric Company, Schenectady, NY (US)

(72) Inventors: Sudhaker Rao Veldhi, Louisville, KY (US); Srujan Kusumba, Louisville, KY (US); Rajagopal Varahabhatla, Atlanta, GA (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 247 days.

(21) Appl. No.: 14/280,730

(22) Filed: May 19, 2014

(65) Prior Publication Data
US 2015/0329347 A1 Nov. 19, 2015

(51) Int. Cl.
*B65B 1/30* (2006.01)
*B67D 3/00* (2006.01)
(Continued)

(52) U.S. Cl.
CPC ............. *B67D 3/00* (2013.01); *B67D 1/0871* (2013.01); *B67D 1/1238* (2013.01);
(Continued)

(58) Field of Classification Search
CPC .... B67D 1/1238; B67D 1/124; B67D 1/1247; B67D 7/44; B67D 7/46; B67D 7/465;
(Continued)

(56) References Cited

U.S. PATENT DOCUMENTS

| 2,853,878 | A | * | 9/1958 | Anderson | ............... G01F 23/74 |
| | | | | | 310/15 |
| 2,911,828 | A | * | 11/1959 | Keating | .............. G01F 23/0038 |
| | | | | | 73/290 R |

(Continued)

FOREIGN PATENT DOCUMENTS

| CN | 202636657 U | | 1/2013 | | |
| GB | 2012431 A | * | 7/1979 | .......... | G01D 5/2275 |
| KR | 20120061526 A | | 6/2012 | | |

*Primary Examiner* — Timothy L Maust
*Assistant Examiner* — Randall Gruby
(74) *Attorney, Agent, or Firm* — Dority & Manning, P.A.

(57) ABSTRACT

Systems and methods for receptacle auto fill using inductive sensing are provided. One example system includes a dispensing system capable of dispensing liquid. The system includes a sensor. The sensor includes a coil positioned adjacent to a dispensing area of the dispensing system. The system includes a receptacle capable of holding a volume of liquid. The system includes a floating object positioned within the receptacle and permitted to move upwards and downwards based on a liquid fill level of the receptacle. The floating object includes a conductive strip providing a first impedance at a first vertical position of the strip and a second impedance at a second vertical position of the strip. The first impedance is different than the second impedance. The system includes a controller configured to control the dispensing system based at least in part on an amount of inductance exhibited between the coil and the conductive strip.

17 Claims, 4 Drawing Sheets

(51) Int. Cl.
| | |
|---|---|
| *F25D 23/12* | (2006.01) |
| *B67D 1/08* | (2006.01) |
| *B67D 1/12* | (2006.01) |
| *G01F 23/36* | (2006.01) |

(52) U.S. Cl.
CPC ......... *B67D 3/0003* (2013.01); *B67D 3/0093* (2013.01); *F25D 23/12* (2013.01); *F25D 23/126* (2013.01); *G01F 23/36* (2013.01); *B67D 2001/1263* (2013.01)

(58) Field of Classification Search
CPC ..... B67D 3/0003; B67D 3/0093; F16K 21/18; F16K 21/185; G01F 23/30–23/44; G01F 23/64; G01F 23/68–23/76
USPC ............... 73/305–322.5; 324/207.11–207.15, 324/207.24, 207.25, 207.26
See application file for complete search history.

(56) References Cited

U.S. PATENT DOCUMENTS

| | | | | | |
|---|---|---|---|---|---|
| 3,112,464 | A | * | 11/1963 | Ratajski | H01L 43/04 310/10 |
| 3,113,282 | A | * | 12/1963 | Coleman | G01F 23/68 210/86 |
| 3,331,245 | A | * | 7/1967 | Barker | G01F 23/72 73/313 |
| 3,505,869 | A | * | 4/1970 | Crawford | G01F 23/70 335/206 |
| 3,685,357 | A | * | 8/1972 | Alexander | G01F 23/70 200/84 C |
| 4,014,015 | A | * | 3/1977 | Gundlach | G01D 5/12 324/207.13 |
| 4,610,165 | A | * | 9/1986 | Duffy | G01M 3/3245 73/305 |
| 4,627,280 | A | * | 12/1986 | Hayashi | G01F 23/76 324/207.16 |
| 4,695,796 | A | * | 9/1987 | Omet | G01D 5/344 250/577 |
| 4,702,107 | A | * | 10/1987 | Guerrini | G01F 23/68 338/33 |
| 4,771,804 | A | * | 9/1988 | Morales | F16K 21/185 137/412 |
| 4,803,427 | A | * | 2/1989 | Mason | G01B 7/003 324/207.13 |
| 4,813,282 | A | * | 3/1989 | Maggia | G01F 23/30 137/432 |
| 4,852,404 | A | * | 8/1989 | Catanese | G01F 23/60 340/624 |
| 4,875,370 | A | * | 10/1989 | Spitzer | G01F 23/0038 307/118 |
| 4,891,980 | A | * | 1/1990 | Kawai | G01V 3/102 324/207.17 |
| 4,939,457 | A | * | 7/1990 | Tellerman | G01F 23/2963 324/207.13 |
| 5,050,430 | A | * | 9/1991 | Begin | G01B 7/003 324/207.13 |
| 5,054,318 | A | * | 10/1991 | Lew | G01F 23/2966 73/290 V |
| 5,056,049 | A | * | 10/1991 | O'Neill | G01B 7/003 340/623 |
| 5,076,101 | A | * | 12/1991 | Lazure | G01F 23/2962 181/124 |
| 5,136,884 | A | * | 8/1992 | Lovett | G01F 23/2963 324/207.13 |
| 5,291,782 | A | * | 3/1994 | Taylor | G01B 7/02 324/207.16 |
| 5,347,875 | A | * | 9/1994 | Lew | G01F 23/68 340/870.37 |
| 5,421,193 | A | * | 6/1995 | Carlin | G01F 23/72 324/207.13 |
| 5,483,831 | A | * | 1/1996 | Steiner | G01F 23/706 73/313 |
| 5,490,547 | A | * | 2/1996 | Abadi | B67D 3/0009 141/21 |
| 5,625,344 | A | * | 4/1997 | Shukla | G01F 23/003 200/220 |
| 5,670,876 | A | * | 9/1997 | Dilger | G01D 5/147 324/207.13 |
| 5,955,881 | A | * | 9/1999 | White | G01B 7/02 324/207.2 |
| 6,167,756 | B1 | * | 1/2001 | Everson, Jr. | G01F 23/68 137/206 |
| 6,192,753 | B1 | * | 2/2001 | Czarnek | G01D 5/2046 73/290 R |
| 6,192,754 | B1 | * | 2/2001 | Czarnek | G01D 5/2046 73/290 R |
| 6,304,078 | B1 | * | 10/2001 | Jarrard | G01B 7/003 324/207.2 |
| 6,541,960 | B2 | * | 4/2003 | Nekado | G01D 3/036 324/207.15 |
| 6,552,532 | B1 | * | 4/2003 | Sako | G01D 5/145 324/207.12 |
| 6,561,022 | B1 | * | 5/2003 | Doyle | A47J 31/4457 324/207.15 |
| 6,681,585 | B1 | * | 1/2004 | Stagg | B67D 1/0871 62/177 |
| 6,813,946 | B1 | * | 11/2004 | Benton | G01F 23/0038 73/290 R |
| 6,867,583 | B2 | * | 3/2005 | Mizutani | G01D 11/245 324/207.24 |
| 6,894,485 | B2 | * | 5/2005 | Green | B60T 13/569 324/207.2 |
| 6,989,670 | B2 | * | 1/2006 | Fahrlander | G01D 5/145 324/207.2 |
| 6,992,478 | B2 | * | 1/2006 | Etherington | G01D 5/145 324/207.2 |
| 7,024,932 | B2 | * | 4/2006 | Nicolazo de Barmon | B22D 2/003 73/290 R |
| 7,034,523 | B2 | * | 4/2006 | Fahrlander | G01D 5/145 324/207.2 |
| 7,062,966 | B1 | * | 6/2006 | Davila | G01F 23/76 73/313 |
| 7,210,601 | B2 | * | 5/2007 | Hortin | B67D 1/0009 222/129.1 |
| 7,449,878 | B2 | * | 11/2008 | Lee | G01D 5/2258 324/207.17 |
| 7,810,345 | B2 | * | 10/2010 | Nebbia | F25D 21/14 222/146.6 |
| 8,299,782 | B2 | * | 10/2012 | Mizuno | G01D 5/145 324/207.24 |
| 8,674,685 | B2 | * | 3/2014 | Paradise | G01F 23/68 324/200 |
| 8,698,738 | B2 | * | 4/2014 | Sakurai | G06F 3/0354 345/156 |
| 9,116,018 | B2 | * | 8/2015 | Frachon | G01D 5/147 |
| 9,347,764 | B2 | * | 5/2016 | Gilmore | G01B 7/14 |
| 2001/0054312 | A1 | * | 12/2001 | Czarnek | G01D 5/2046 73/313 |
| 2004/0046571 | A1 | * | 3/2004 | Champion | G01F 23/284 324/637 |
| 2004/0145377 | A1 | * | 7/2004 | Sherrard | G01F 23/284 324/644 |
| 2005/0005696 | A1 | * | 1/2005 | Hale | B60K 15/00 73/290 V |
| 2005/0178273 | A1 | * | 8/2005 | Meuleners | F25D 23/126 99/279 |
| 2007/0278141 | A1 | * | 12/2007 | Patera | C02F 1/003 210/110 |
| 2010/0269586 | A1 | * | 10/2010 | Beneker | G01F 23/68 73/313 |
| 2012/0213644 | A1 | * | 8/2012 | Phillips | B67D 1/0004 417/1 |
| 2013/0139586 | A1 | * | 6/2013 | Czarnek | G01F 23/68 73/313 |

(56) References Cited

U.S. PATENT DOCUMENTS

2013/0146179 A1      6/2013  McMahan
2014/0008296 A1*     1/2014  Mills .......................... C02F 3/28
                                                              210/614
2015/0292136 A1*    10/2015  Leonard .................. D06F 33/02
                                                              8/147

* cited by examiner

SYSTEMS AND METHODS FOR RECEPTACLE AUTO FILL USING INDUCTIVE SENSING

FIELD OF THE INVENTION

The present disclosure relates generally to receptacle auto fill. More particularly, the present disclosure relates to systems and methods for receptacle auto fill using inductive sensing.

BACKGROUND OF THE INVENTION

Certain refrigerator appliances include a dispensing system for dispensing ice and/or liquid water. Such dispensing system generally include an actuator, such as a button or paddle, for initiating a flow of ice and/or liquid water into a dispensing area of the dispensing system. By pressing the actuator, a user can initiate the flow of ice and/or liquid water into a receptacle, such as a cup or pitcher, positioned within the dispensing area.

Certain dispensing systems can include one or more sensors for performing automatic filling of the receptacle, such that the user is not required to operate an actuator. For example, such dispensing systems can employ vision-based sensing (e.g. a camera an associated image processing software), ultrasonic sensors, or magnetic sensors. However, each of these types of sensors suffers from various drawbacks.

As an example, vision-based sensing requires relatively expensive components such as a camera and hardware and software for performing image processing. In addition, under certain usage conditions, vision sensors can become contaminated with foreign material including, but not limited to, colas, juices, food particles, or other contaminants or pollutants. For example, such contaminants can become affixed to or otherwise impair or inhibit proper operation of the vision sensor by clouding or otherwise blocking the imagery captured by the vision sensor.

Ultrasonic sensors can have difficulty accurately and precisely measuring various parameters such as water level, container heights, or other parameters. As an example, ultrasonic sensors can also become contaminated with foreign material. Operation of the ultrasonic sensor assembly while in a contaminated state (i.e. with substantial contaminants present) can result in decreased performance. For example, a contaminated ultrasonic sensor assembly may exhibit increased detection of false positives, failure to detect an object at all, or other improper operations. Likewise, magnet-based sensors tend to be unreliable and can result in poor system performance.

Therefore, improved systems and methods for receptacle auto fill are needed. In particular, systems and methods for receptacle auto fill that are relatively inexpensive, reliable, and insensitive to environmental contaminants and conditions are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to a system for automatically filling a receptacle. The system includes a dispensing system capable of dispensing liquid. The system includes a sensor. The sensor includes a coil positioned adjacent to a dispensing area of the dispensing system. The system includes a receptacle capable of holding a volume of liquid. The system includes a floating object positioned within the receptacle and permitted to move upwards and downwards based on a liquid fill level of the receptacle. The floating object includes a conductive strip providing a first impedance at a first vertical position of the strip and a second impedance at a second vertical position of the strip. The first impedance is different than the second impedance. The system includes a controller configured to control the dispensing system based at least in part on an amount of inductance exhibited between the coil and the conductive strip.

Another aspect of the present disclosure is directed to receptacle for use with an automatic filling system. The receptacle includes a structure that defines a volume capable of holding a liquid. The receptacle includes a floating object positioned within the structure. The floating object is permitted to move upwards and downwards through at least a portion of a fill range of the receptacle. The receptacle includes a conductive strip attached to the floating object. The conductive strip has at least two different impedances at at least two different vertical positions. The receptacle includes a guide attached to an inside wall of the structure. The guide maintains an orientation of the floating object and guides the floating object as it moves upwards and downwards.

Another aspect of the present disclosure is directed to a method for operating a dispensing system to automatically fill a receptacle with a liquid. The method includes determining an amount of inductance between a coil included in a sensor of the dispensing system and a conductive strip attached to a floating object included in the receptacle. The conductive strip has varying impedances at vertical positions of the conductive strip. The floating object is permitted to move vertically corresponding to a liquid fill level of the receptacle. The method includes determining the liquid fill level of the receptacle based at least in part on the amount of inductance between the coil and the conductive strip. The method includes controlling the dispensing system based on the determined liquid fill level to automatically fill the receptacle with liquid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
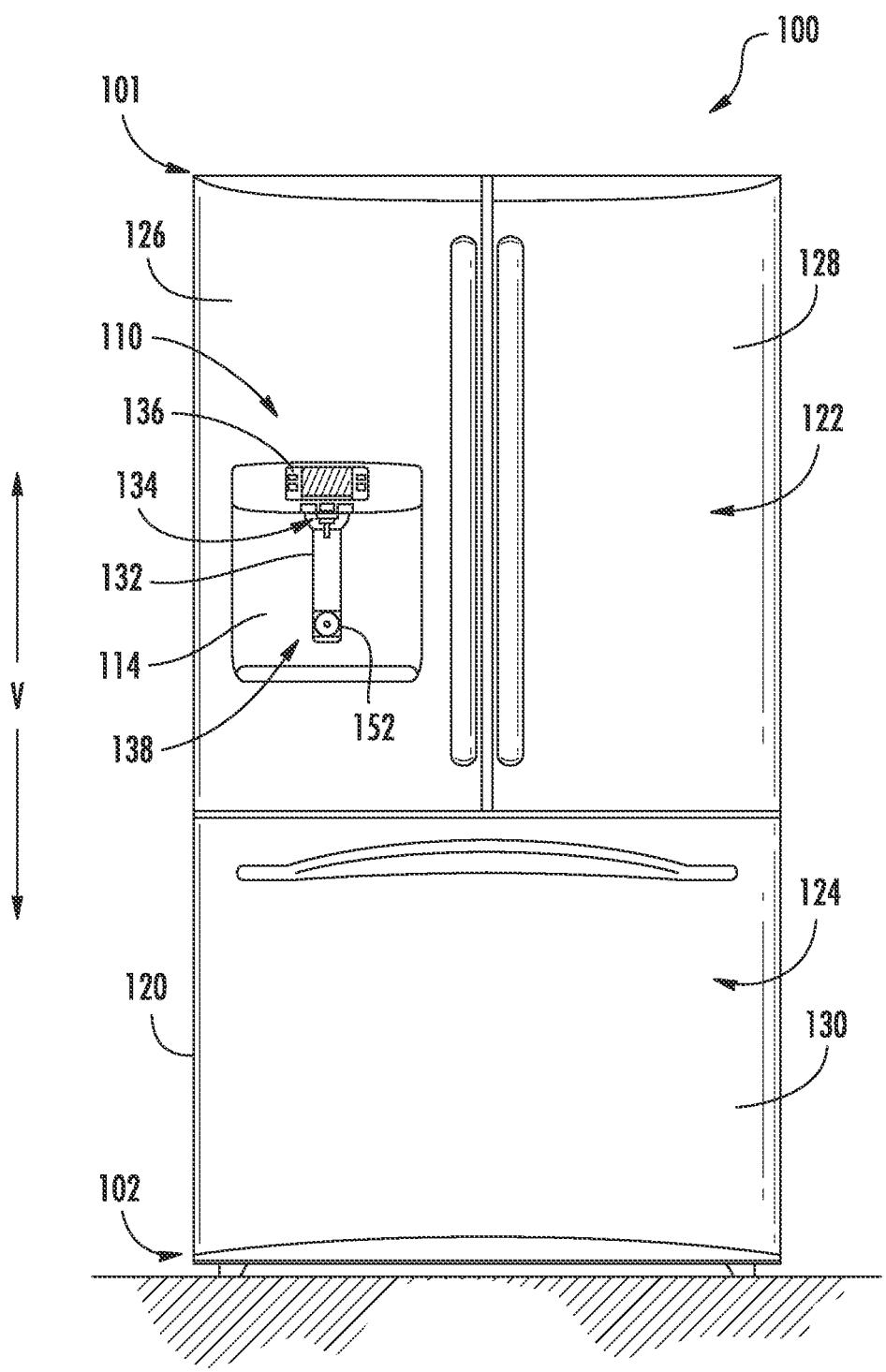
FIG. 1 provides a front, elevation view of an example refrigerator appliance according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of an exemplary refrigerator appliance 100 according to an exemplary embodiment of the present disclosure. Refrigerator appliance 100 defines a vertical direction V and extends between an upper portion 101 and a lower portion 102 along the vertical direction V. Refrigerator appliance 100 includes a cabinet or housing 120 that defines chilled chambers for receipt of food items for storage. In particular, refrigerator appliance 100 defines a fresh food chamber 122 at upper portion 101 of refrigerator appliance 100 and a freezer chamber 124 arranged below fresh food chamber 122 on the vertical direction V, e.g., at lower portion 102 of refrigerator appliance 100. As such, refrigerator appliance 100 is generally referred to as a bottom mount refrigerator appliance.

However, using the teachings disclosed herein, one of skill in the art will understand that the present subject matter can be used with other types of refrigerator appliances (e.g., side-by-side style or top mount style); a freezer appliance; or any other type of appliance as well. Further, the present disclosure can be applied to dispensing systems outside the contexts of home appliances, such as commercial or office liquid dispensing systems. Consequently, the description of refrigerator appliance 100 set forth herein is for illustrative purposes only and is not intended to limit the present subject matter in any aspect.

Refrigerator doors 126 and 128 are rotatably hinged to an edge of housing 120 for accessing fresh food compartment 122. A freezer door 130 is arranged below refrigerator doors 126 and 128 for accessing freezer chamber 124. Freezer door 130 is coupled to a freezer drawer (not shown) slidably mounted within freezer chamber 124.

Refrigerator appliance 100 also includes a dispensing system 110 for dispensing water and/or ice. Dispensing system 110 includes a dispenser 114 positioned on or mounted to an exterior portion of refrigerator appliance 100, e.g., on refrigerator door 126. Dispenser 114 includes a discharging outlet 134 for accessing ice and water. A paddle or actuator 132 can be mounted below discharging outlet 134 for operating dispenser 114. In alternative exemplary embodiments, any suitable actuator may be used to operate dispenser 114, such as a button, or the dispensing system 110 may operate solely based on voice commands or auto fill sensors.

A user interface panel 136 is provided for controlling the mode of operation. For example, user interface panel 136 can include a water dispensing button (not labeled) and an ice-dispensing button (not labeled) for selecting a desired mode of operation such as crushed or non-crushed ice.

Discharging outlet 134 and actuator 132 are an external part of dispenser 114 and are mounted in a dispenser recess 138 defined in an outside surface of refrigerator door 126. Dispenser recess 138 is positioned at a predetermined elevation convenient for a user to access ice or water and enabling the user to access ice without the need to bend-over and without the need to access freezer chamber 124. In the exemplary embodiment, dispenser recess 138 is positioned at a level that approximates the chest level of a user.

According to an aspect of the present disclosure, the dispensing system 110 can further include or otherwise be in operative communication with a sensor 152 for performing receptacle auto fill using inductive sensing. In particular, sensor 152 can include a coil placed adjacent to the dispensing area. Sensor 152 can also include an inductance to digital converter. Sensor 152 and dispensing system 110 can be operated to provide auto fill using inductive sensing, as will be discussed further below.

The operation of sensor 152 and/or dispensing system 110 can be controlled by a controller (not depicted). As used herein, the term "controller" broadly refers to computers, processors, microcontrollers, microcomputers, programmable logic controllers, application specific integrated circuits, and other programmable circuits, or forms of computerized intelligence. In some embodiments, the controller can be a general purpose microprocessor that implements instructions from a memory. The memory can be non-transitory computer-readable media such as RAM, ROM, hard drives, flash drives, or other memory devices.

Figure 2:
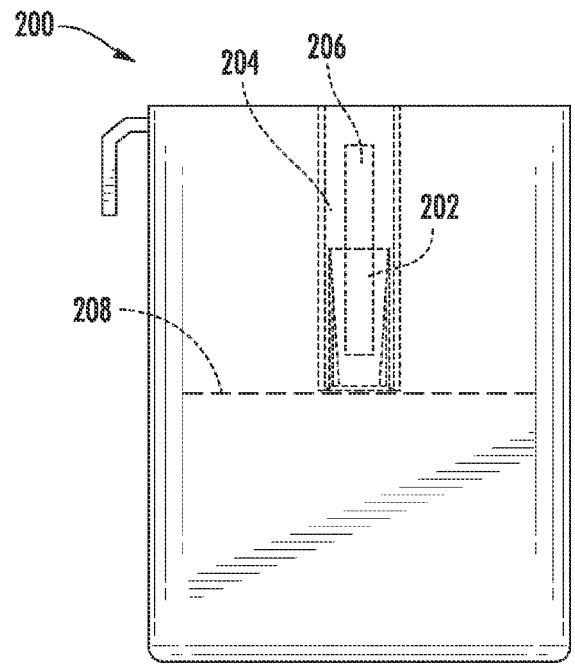
FIG. 2 depicts an example receptacle according to an example embodiment of the present disclosure.

FIG. 2 depicts an example receptacle 200 according to an example embodiment of the present disclosure. Receptacle 200 can have a structure (e.g. a plurality of walls and a base) that defines a volume capable of holding a liquid.

Receptacle 200 can also include or have positioned therein a floating object 202. Floating object 202 can be any object or material that will float when placed in a liquid (e.g. water). For example, floating object 202 can be a plastic object enclosing a volume of air.

Floating object 202 can be permitted to move upwards and downwards through at least a portion of a fill range of the receptacle 200. For example, receptacle 200 can include a guide 204 that maintains an orientation of the floating object or otherwise guides the floating object as it moves upwards and downwards.

In some embodiments, guide 204 can be a housing having a width and depth that corresponds to a width and depth of the floating object. The housing can have an opening 206 that allows entry of the liquid into the housing such that the floating object floats on the liquid within the housing. However, various other forms of a guide can be used (e.g. a guide rail).

In some embodiments, the guide 204 can permit the floating object 202 to move upwards and downwards through only a portion of the fill range of the receptacle. As an example, as shown in FIG. 2, the guide 204 may have a floor that stops the floating object from moving downwards past a vertical position corresponding to a half-full fill level 208. In such fashion, at least a portion of the floating object will be aligned or otherwise interact with the sensor coil.

According to another aspect of the present disclosure, a conductive strip can be attached to or otherwise included in the floating object. The conductive strip can have at least two different impedances at at least two different vertical positions. The conductive strip will be discussed in more detail with respect to FIGS. 4 and 5.

Figure 3:
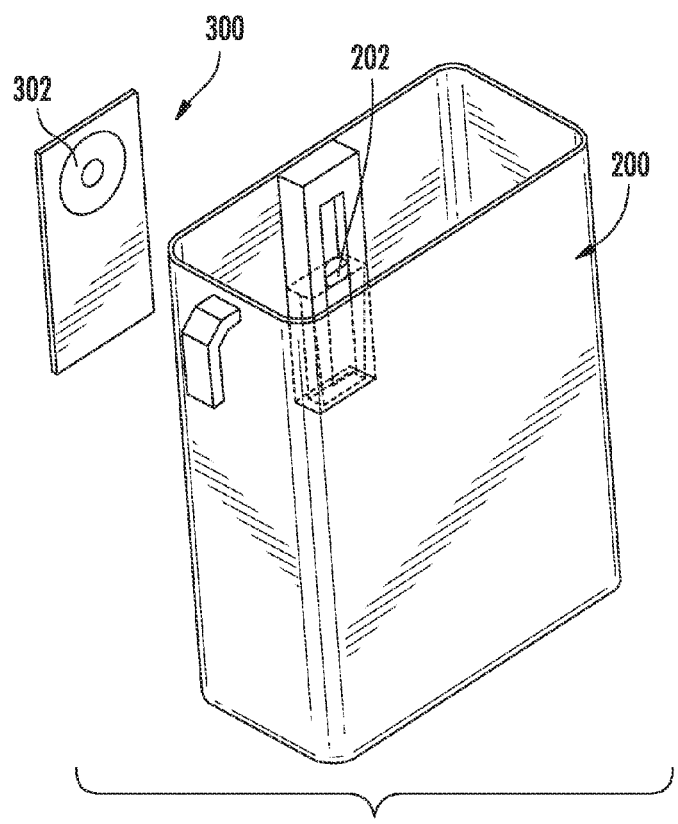
FIG. 3 depicts an example receptacle and an example sensor according to an example embodiment of the present disclosure.

FIG. 3 depicts an example receptacle 200 and an example sensor 300 according to an example embodiment of the present disclosure. Sensor 300 can include a sensor coil 302. The sensor coil 302 can be positioned adjacent to the dispensing area of a dispensing system. Thus, when the receptacle 200 is placed in the dispensing area, the floating object 202 can be aligned with the coil 302. In particular, the floating object 202 will be aligned with the coil at varying vertical heights depending upon a current fill level of the receptacle 200.

Figure 4:
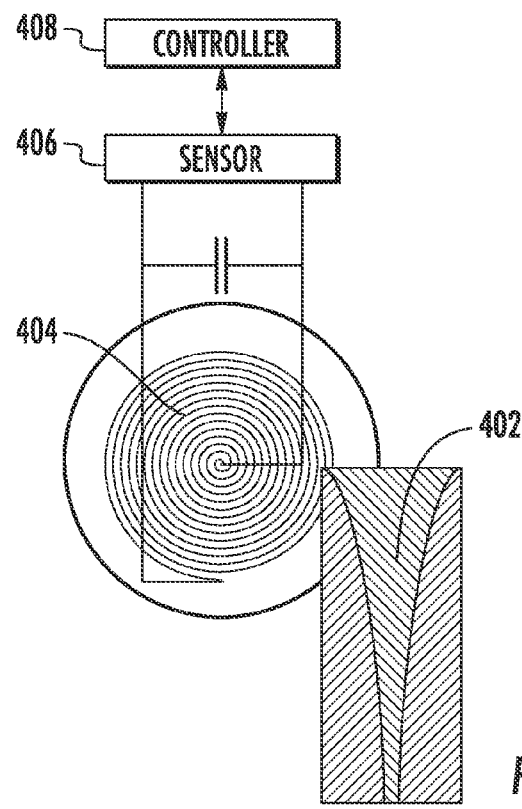
FIG. 4 depicts a simplified diagram of an example conductive strip aligned with an example coil according to an example embodiment of the present disclosure.

FIG. 4 depicts a simplified diagram of an example conductive strip 402 aligned with an example coil 404 according to an example embodiment of the present disclosure. In particular, in FIG. 4, conductive strip 402 is aligned with coil 404 at a first vertical position due to the fill level in the corresponding receptacle being less than full.

Figure 5:
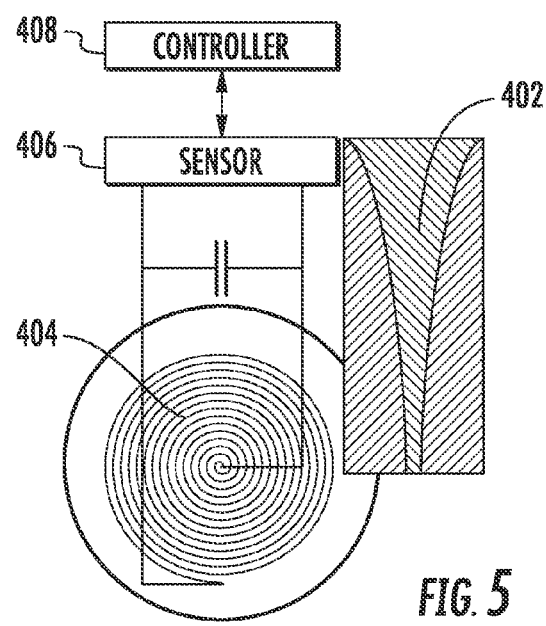
FIG. 5 depicts a simplified diagram of an example conductive strip aligned with an example coil according to an example embodiment of the present disclosure.

Likewise, FIG. 5 depicts a simplified diagram of example conductive strip 402 aligned with an example coil 404 according to an example embodiment of the present disclosure. In particular, in FIG. 5, conductive strip 402 is aligned with coil 404 at a second vertical position due to the fill level in the corresponding receptacle being full.

Referring to both FIG. 4 and FIG. 5, conductive strip 402 can provide at least two different impedances at at least two different vertical positions. As an example, as depicted in FIGS. 4 and 5, conductive strip 402 can have a first cross-sectional area at its top and a second cross-sectional area at its bottom. The cross-sectional area of the conductive strip can continually decrease from the top to the bottom.

In particular, conductive strip 402 can have a first width at the top and a second width at the bottom. The first width can be greater than the second width, as shown. The width of the conductive strip can be tapered between the first and second widths. The tapering can be linear or non-linear.

However, in some embodiments, the width of the conductive strip 402 can be stepped between the first and second widths. In other embodiments, the thickness of conductive strip 402 can be varied, rather than the width and/or cross-sectional area. Other embodiments of conductive strips according to the present disclosure may have varying impedances due to any combination of varying parameters, including, for example, use of varying materials, varying widths, varying thicknesses, or other varying properties. The conductive strips can provide stepped or continuous change in impedance.

The coil 404 can be made of a conductive material and can be attached to circuitry (e.g. a sensor 406 and/or controller 408) capable of applying an electrical signal across the coil 404 (e.g. a high frequency alternating current signal). Flow of the electrical signal through coil 404 can generate a magnetic field. A portion of the magnetic field will pass through the conductive strip 402, thereby generating eddy currents in the conductive strip 402 via inductance.

The magnitude of the eddy currents can be a function of distance between the coil 404 and the conductive strip 402 and the impedance provided by the portion of conductive strip 402 that is aligned with the coil 404. The impedance provided by the portion of conductive strip 402 that is aligned with the coil 404 can be a function of the material of such portion, the cross-sectional area of such portion, the width of such portion, and/or the thickness (e.g. depth) of such portion of the conductive strip 402.

Thus, the conductive strip 402 and the coil 404 can be inductively coupled, with the amount of inductance dependent upon which portion of conductive strip 402 is aligned with coil 404. In particular, the inductive energy used in the generation of eddy currents in the conductive strip 402 can cause the conductive strip 402 to be viewed as providing a virtual resistance. The virtual resistance can be proportional to the amount of impedance provided by portion of conductive strip 402 that is aligned with the coil 404.

When conductive strip 402 provides a greater virtual resistance to coil 404, application of a standard voltage signal across coil 404 will result in a relatively lower magnitude of current flow. Likewise, when conductive strip 402 provides a smaller virtual resistance to coil 404, application of the standard voltage signal across coil 404 will result in a relatively greater magnitude of current flow. The same principles can be applied to a standardized current flow and varying observed voltage.

As an example, as shown in FIG. 4, the top of conductive strip 402 is aligned with coil 404. The top of conductive strip 402 provides a greater impedance than the bottom of conductive strip 402. Thus, when the top is aligned with coil 404, a greater amount of inductance will occur between the coil 404 and the conductive strip 402, thereby providing a greater amount of virtual resistance.

As the fill level of the receptacle increases, the floating object and the conductive strip 402 will move upwards, thereby changing the portion of conductive strip 402 that is aligned with coil 404. As an example, as shown in FIG. 5, when the receptacle is full, the bottom of conductive strip 402 will be aligned with coil 404. The bottom of conductive strip 402 provides a smaller impedance than the top of conductive strip 402. Thus, when the bottom is aligned with coil 404, a relatively less amount of inductance will occur between the coil 404 and the conductive strip 402, thereby providing a relatively lesser amount of virtual resistance.

As noted above, virtual resistance can be measured by applying either a standardized voltage or current across the coil and then measuring the corresponding current or voltage, respectively.

Sensor 406 can be any suitable circuitry for measuring the amount of inductance occurring between coil 404 and conductive strip 402. As an example, sensor 406 can apply a standardized voltage across coil 404 and measure the magnitude of the resulting current. The sensor 406 can then output a signal that is indicative of the relative position of the conductive strip 402 based at least in part on such measurements. In some embodiments, sensor 406 can include an inductance to digital converter.

Controller 408 can be one or more computers, processors, microcontrollers, microcomputers, programmable logic controllers, application specific integrated circuits, or other programmable circuits, or forms of computerized intelligence. In some embodiments, the controller can be a general purpose microprocessor that implements instructions from a memory. The memory can be non-transitory computer-readable media such as RAM, ROM, hard drives, flash drives, or other memory devices. Controller 408 can control the dispensing system based on the signal output by sensor 406.

Figure 6:
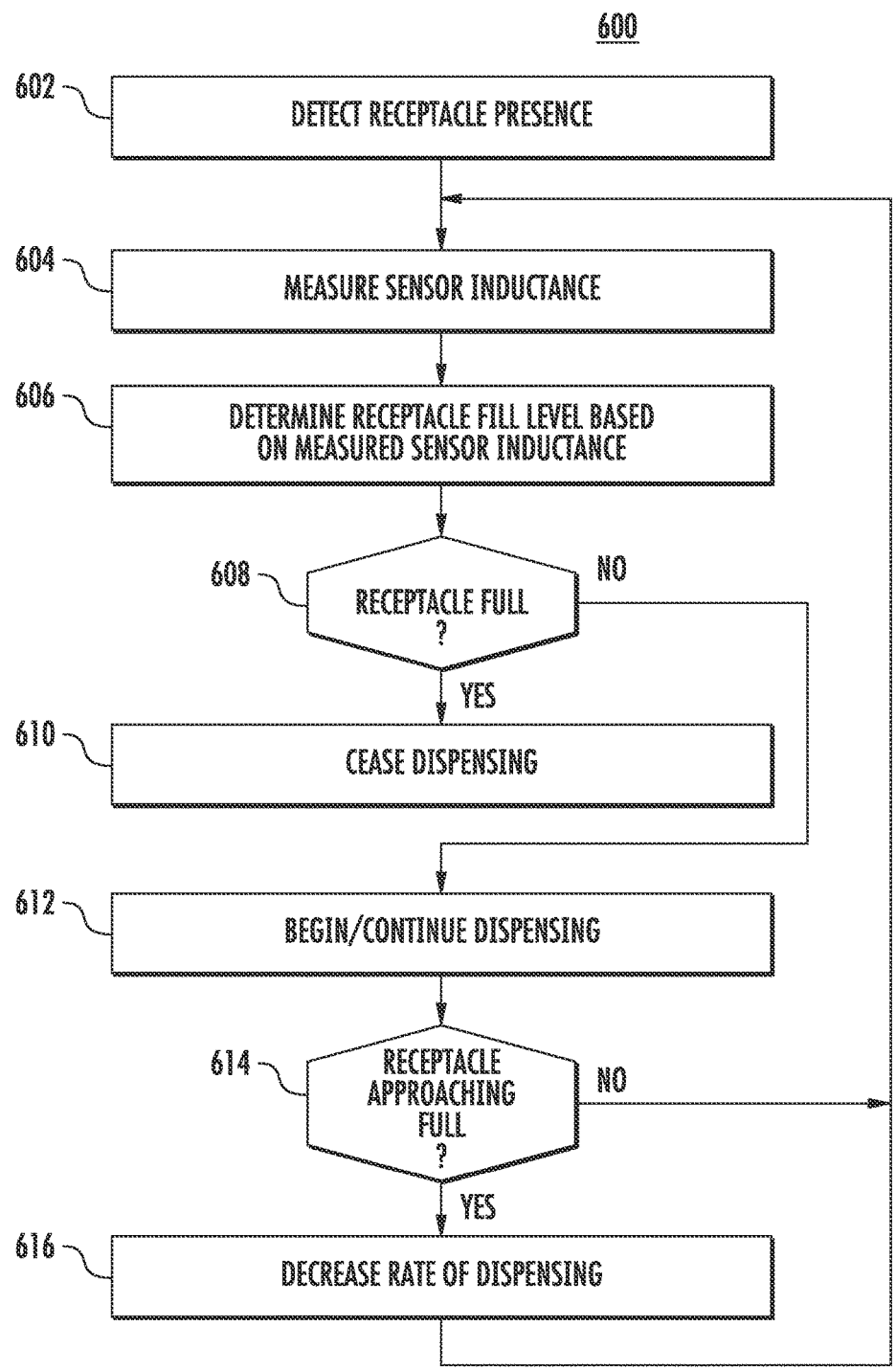
FIG. 6 depicts a flow chart of an example method for operating a dispensing system to automatically fill a receptacle with a liquid according to an example embodiment of the present disclosure.

FIG. 6 depicts a flow chart of an example method (600) for operating a dispensing system to automatically fill a receptacle with a liquid according to an example embodiment of the present disclosure. Example method (600) can be implemented by any suitable dispensing system.

In addition, FIG. 6 depicts steps performed in a particular order for purposes of illustration and discussion. Those of ordinary skill in the art, using the disclosures provided herein, will understand that the various steps of method (600) can be omitted, adapted, performed simultaneously, and/or rearranged in various ways without departing from the scope of the present disclosure.

At (602) the presence of a receptacle in the dispensing area of the dispensing system can be detected. For example, a sensor can observe a jump in inductance caused by a conductive strip being placed adjacent to a coil of the sensor. As another example, a pressure sensor or a motion sensor can be used to identify when a receptacle is placed in the dispensing area.

At (604) an amount of sensor inductance can be measured. As an example, in some embodiments, measuring the amount of sensor inductance at (604) can include applying a predetermined voltage across the coil and determining a magnitude of a current flowing through the coil when the predetermined voltage is applied. The magnitude of the current can be inversely proportional to the amount of inductance.

At (606) a receptacle fill level can be determined based on the measured sensor inductance. For example, if the conductive strip provides a relatively greater impedance when the receptacle is not full and a relatively smaller impedance when the receptacle is full, then the magnitude of the current can be proportional to the fill level.

As an example, if the magnitude of the current (or a sensor output indicative of such current magnitude) is greater than a threshold value, then the receptacle can be determined at (606) to be full. However, if the magnitude of the current (or the sensor output indicative of such current magnitude) is less than the threshold value, then the receptacle can be determined at (606) to be less than full. In further embodiments, a plurality of threshold values can be used to place the fill level into one of a plurality of categories (e.g. one-half full, two-thirds full, three-fourths full, full, etc.).

At (608) it can be checked whether the receptacle was determined to be full at (606). If it is determined that the receptacle is full, then method (600) can proceed to (610) and cease dispensing or otherwise continue to not dispense liquid.

However, if it is determined at (608) that the receptacle is less than full, then method (600) can proceed to (612) and begin or otherwise continue dispensing.

At (614) it can be determined whether the receptacle is approaching a full fill level. For example, if the magnitude of the current (or the magnitude of a sensor output signal indicative of the amount of inductance) is approaching the threshold value associated with a full fill level, then it can be determined that the receptacle is approaching a full fill level. Alternatively, an additional threshold value just less than the threshold value associated with a full fill level can be used to identify when the receptacle is approaching the full fill level.

If it is determined at (614) that the receptacle is not approaching a full fill level, then method (600) can return to (604) and again measure the sensor inductance.

However, if it is determined at (614) that the receptacle is approaching the full fill level, then method (600) can proceed to (616) and decrease the rate of dispensing. In such fashion, splashing or other incidental spillage can be reduced.

After (616), method (600) can return to (604) and again measure the sensor inductance. In such fashion, inductive sensing can be used to automatically fill a receptacle. The inductive sensing provides superior accuracy and insensitivity to environmental factors such as contaminants.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for automatically filling a receptacle, the system comprising:
    a dispensing system capable of dispensing liquid;
    a sensor, wherein the sensor comprises a coil positioned adjacent to a dispensing area of the dispensing system;
    the receptacle, the receptacle comprising:
        a structure that defines a volume capable of holding the liquid;
        a floating object positioned within the structure, wherein the floating object is permitted to move upwards and downwards through the at least a portion of a fill range of the receptacle, wherein the floating object comprises a conductive strip that has at least two different impedances respectively at at least two different vertical positions of the conductive strip; and
        a guide attached to an inside wall of the structure, wherein the guide maintains an orientation of the floating object and guides the floating object as it moves upwards and downwards, the guide configured such that at least a portion of the floating object remains in a position proximate to the sensor irrespective of the volume of liquid in the receptacle, wherein the guide further comprises a barrier that confines at least one of the upward and downward movements of the floating object irrespective of the volume of liquid in the receptacle, wherein the barrier comprises a ceiling that confines the upward movement of the floating object irrespective of the volume of liquid in the receptacle; and
    a controller configured to control the dispensing system based at least in part on an amount of inductance exhibited between the coil and the conductive strip.

2. The system of claim 1, wherein:
    the conductive strip provides a first impedance at a first vertical position of the conductive strip and provides a second impedance at a second vertical position of the conductive strip, the first impedance different than the second impedance; and
    the coil, receptacle, and floating object are positioned such that the second vertical position of the conductive strip is aligned with the coil only when the receptacle has a full liquid fill level.

3. The system of claim 1, wherein the floating object is positioned adjacent to an inside wall of the receptacle.

4. The system of claim 1, wherein the conductive strip has a first cross-sectional area at a first vertical position of the conductive strip and a second cross-sectional area at a second vertical position of the conductive strip, wherein the first cross-sectional area is different from the second cross-sectional area, such that the conductive strip provides a first impedance at the first vertical position that is different from a second impedance provided at the second vertical position.

5. The system of claim 4, wherein the conductive strip is tapered from a first width at the first vertical position to a second width at the second vertical position.

6. The system of claim 1, wherein the sensor is configured to determine the amount of inductance exhibited between the coil and the conductive strip by applying a predetermined voltage across the coil and measuring a resulting current magnitude.

7. The system of claim 1, wherein the sensor further comprises an inductance to digital converter.

8. The system of claim 1, wherein:
the conductive strip provides a first impedance at a first vertical position of the conductive strip and provides a second impedance at a second vertical position of the conductive strip;
the first vertical position comprises a top of the conductive strip;
the second vertical position comprises a bottom of the conductive strip;
the first impedance is greater than the second impedance; and
the amount of impedance provided by the conductive strip continuously decreases from the top of the conductive strip to the bottom of the conductive strip.

9. The system of claim 8, wherein a relative height of the floating object can be determined based at least in part on the impedance provided by the conductive strip to the coil.

10. The system of claim 1, wherein the sensor includes a face and wherein the guide has a configuration such that the upward and downward movements of the floating object are parallel to the face of the sensor.

11. The system of claim 1, wherein the barrier comprises a floor that confines the downward movement of the floating object irrespective of the volume of liquid in the receptacle.

12. A receptacle for use with an automatic filling system, the receptacle comprising:
a structure that defines a volume capable of holding the liquid;
a floating object positioned within the structure, wherein the floating object is permitted to move upwards and downwards through the at least a portion of a fill range of the receptacle, wherein the floating object comprises a conductive strip that has at least two different impedances respectively at at least two different vertical positions of the conductive strip; and
a guide attached to an inside wall of the structure, wherein the guide maintains an orientation of the floating object and guides the floating object as it moves upwards and downwards, the guide configured such that at least a portion of the floating object remains in a position proximate to the sensor irrespective of the volume of liquid in the receptacle, wherein the guide further comprises a barrier that confines at least one of the upward and downward movements of the floating object irrespective of the volume of liquid in the receptacle, wherein the barrier comprises a ceiling that confines the upward movement of the floating object irrespective of the volume of liquid in the receptacle.

13. The receptacle of claim 12, wherein:
the conductive strip has a first width at its top;
the conductive strip has a second width at its bottom;
wherein the first width is greater than the second width.

14. The receptacle of claim 13, wherein the conductive strip is tapered between the first and second widths.

15. The receptacle of claim 12, wherein the conductive strip is embedded within the floating object.

16. The receptacle of claim 12, wherein the guide comprises a housing that is attached to the inside wall of the structure, the housing having a width and depth that corresponds to a width and depth of the floating object, and wherein the housing has an opening that allows the entry of the liquid into the housing such that the floating object floats on the liquid.

17. The receptacle of claim 12, wherein the portion of the fill range of the receptacle for which the floating object is permitted to move upwards and downwards includes at least a half-full fill position to a full fill position.

* * * * *

UNITED STATES PATENT AND TRADEMARK OFFICE
CERTIFICATE OF CORRECTION

PATENT NO. : 9,663,343 B2
APPLICATION NO. : 14/280730
DATED : May 30, 2017
INVENTOR(S) : Sudhaker Rao Veldhi, Srujan Kusumba and Rajagopal Varahabhatla Page 1 of 1

It is certified that error appears in the above-identified patent and that said Letters Patent is hereby corrected as shown below:

In the Claims

Remove "the" in Column 10, Line 1 (Claim 12).

Signed and Sealed this
Twenty-seventh Day of March, 2018

Andrei Iancu
*Director of the United States Patent and Trademark Office*